2,908,137

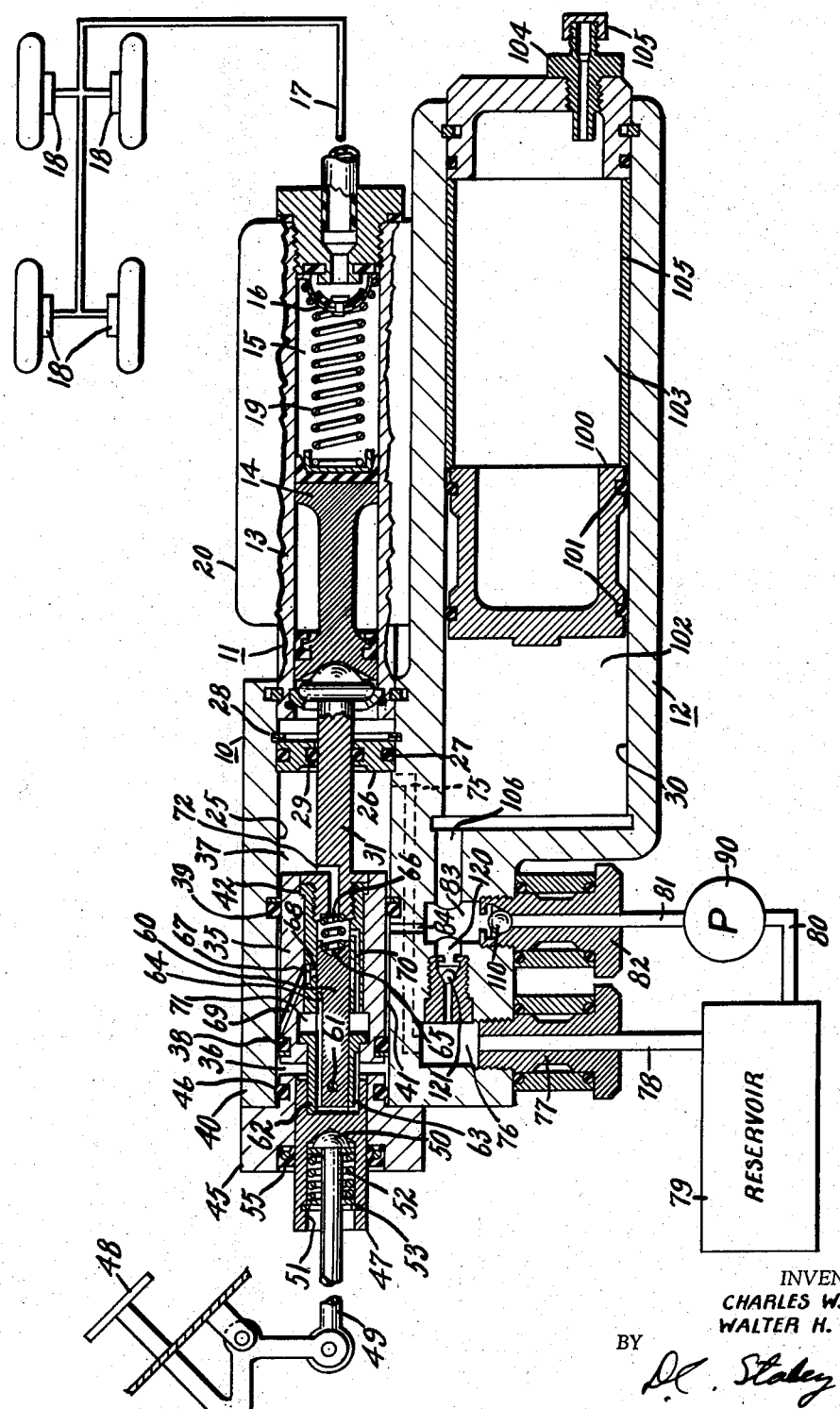
Oct. 13, 1959  C. W. SPALDING ET AL  2,908,137
HYDRAULIC POWER BRAKE UNIT
Filed Feb. 12, 1957
INVENTORS
CHARLES W. SPALDING
WALTER H. WEST
BY
THEIR ATTORNEY United States Patent Office 2,908,137
Patented Oct. 13, 1959

HYDRAULIC POWER BRAKE UNIT

Charles W. Spalding, Saginaw, and Walter H. West, Bay City, Mich., assignors to General Motors Corporation, Detroit, Mich., a corporation of Delaware Application February 12, 1957, Serial No. 639,654

5 Claims. (Cl. 60—51)

This invention relates to power units for operating the foot actuated brakes of a vehicle, and particularly relates to a hydraulically operated power unit.

In this invention a hydraulically operated servo motor is directly connected with a master cylinder so that the servo motor will effect power operation of the master cylinder and thereby effect power application of the pressure fluid to the hydraulic brakes of a vehicle. The servo motor is provided with a valve device that follows the power plunger of the servo motor to maintain control of the power actuation of the master cylinder, the valve device being under manual control of the operator of the vehicle. The servo motor is supplied with liquid under pressure from a suitable pressure source, such as a pump, and the pressure supplied to the servo motor is also delivered to a liquid pressure accumulator that is charged with a high pressure gas so as to provide for a supply of high pressure hydraulic liquid for delivery to the servo motor to maintain power operation of the servo motor in the event the pressure source should fail for any reason. A system of check valves is provided to prevent loss of pressure from the accumulator upon failure of the power source and to provide for a circulation of hydraulic liquid within the servo motor between the inlet and outlet thereof when the servo motor is required to be manually operated during a period of failure of the power source, the circulating liquid preventing either side of the servo motor from pulling a vacuum which would retard manual operation of the servo motor and thereby retard operation of the master cylinder.

Further objects and advantages of the present invention will be apparent from the following description, reference being had to the accompanying drawings wherein a preferred form of the invention is clearly shown.

In this invention the hydraulically operated power unit consists of a hydraulically operated servo motor 10, a hydraulic master cylinder 11 and a liquid pressure accumulator 12 that are arranged in cooperating side by side relationship to form the unitary structure that can be assembled into a vehicle as a complete unit.

The master cylinder 11 is a more or less conventional structure that includes a cylinder 13 that has a piston plunger 14 therein. The chamber 15 ahead of the piston plunger 14 is filled with hydraulic fluid from a reservoir 20 that is discharged from the cylinder 13 through the residual check valve 16 of conventional type into the hydraulic brake line 17 for distribution to the wheel cylinders of the brakes 18. A compression spring 19 normally urges the piston plunger 14 to its rearward or retracted position, as shown in the drawing. The master cylinder 11 operates in conventional manner well understood in the art and further description therefore is considered unnecessary.

The servo motor 10 and the accumulator 12 are constructed as an integral unit in a single housing to which the master cylinder 11 is secured by bolts (not shown) in any suitable manner. The housing forming the servo motor 10 and accumulator 12 has the first cylindrical bore 25 that provides the cylinder for the servo motor and a second cylindrical bore 30 that forms the cylinder for the accumulator 12.

The cylinder bore 25 of the servo motor 10 is closed at one end by a closure wall 26 that has an O-ring 27 sealing the interior of the cylinder bore 25, the wall 26 being held in place by a snap ring 28. An O-ring seal 29 engages the plunger extension 31 of a plunger 35 that reciprocates within the cylinder bore 25.

The reciprocable plunger 35 divides the cylinder bore 25 into two chambers one being a pressure work chamber 36 and the other being an exhaust chamber 37. The plunger 35 carriers an O-ring seal 38 at one end thereof and a O-ring seal 39 is carried in the cylinder wall 40 whereby to provide an annular space 41 around the plunger 35 adapted to receive hydraulic fluid under pressure from a suitable source of supply in a manner hereinafter described. The plunger extension 31 is threadedly received in the sleeve 42 that is a press fit in the plunger 35 whereby the extension 31 is integral with the plunger 35 and extends forwardly of the servo motor 10 and is connected with the piston plunger 14 of the master cylinder for concurrent operation of the plunger 35 and the master cylinder plunger 14.

The opposite end of the cylinder bore 25 has a closure wall 45 that is secured to the cylinder wall 40 by suitable bolts or screws (not shown) and has an O-ring seal 46 to prevent loss of pressure fluid from the work chamber 36.

The closure wall 45 slidably supports an actuating member 47 that is operated by the foot pedal 48 of a vehicle. The actuating member 47 is connected with the foot pedal 48 by means of a rod 49 having a head 50 spring urged against the bottom of the recess 51 in the member 47 by means of the compression spring 52 that is retained in the recess 51 by a snap ring 53. A seal structure 55 engages the outer periphery of the member 47 to prevent loss of fluid from the work chamber 36.

The forward end of the actuating member 47 supports a slide valve element 60 that is secured to the member 47 by the transverse pin 61, a sleeve 62 being provided around the valve element 60 and having longitudinally extending passages 63 that connect the work chamber 36 with the longitudinally extending passage 64 in the periphery of the valve element 60. The valve element 60 has the forward end thereof slidable in a bore 65 provided in the sleeve 42 and is spring urged in a leftward direction by the compression spring 66.

The sleeve 42 has an annular recess 67 adapted to be connected with the longitudinal passage 64 by the ports 68 so that liquid under pressure can pass from the annular chamber 41 through the ports 69 into the annular groove 67 and from the groove 67 through the port 68 into the passage 64 for supply of liquid under pressure to the work chamber 36 through the passage 63 when the valve element 60 has been actuated by the foot pedal 48.

A passage 70 is provided in the wall of the sleeve and connects the chamber 71 with the bore 65 ahead of the valve element 60. A passage 72 is provided in the plunger extension 31 and connects the bore 65 with the exhaust chamber 37. Thus when the valve element 60 is in the position illustrated in the drawing the work chamber 36 is connected with the exhaust chamber 37 through the passages 63, 64, the chamber 71 and passages 70, chamber 65 and passage 72. Thus the work chamber 36 is exhausted of liquid under pressure when the brake is in released position.

The exhaust chamber 37 is connected by means of a passage 75 with an outlet port 76 that has a fitting 77 therein providing a connection for a conduit 78 that connects with a reservoir 79.

The reservoir 79 is connected by a conduit 80 with a liquid pressure pump 90 that supplied liquid under pressure through the conduit 81 to an inlet fitting 82 that is disposed in an inlet port 83 in the housing wall, the port 83 being connected by means of a passage 84 with the annular space 41 around the plunger 35 whereby liquid under pressure is delivered to the servomotor 10.

The pressure accumulator 12 has a piston 100 therein carrying the O-ring seals 101. The piston divides the cylinder bore 30 of the accumulator into a liquid pressure chamber 102 and a gas pressure chamber 103. The gas pressure chamber 103 is charged with a predetermined gaseous pressure through the charging fitting 104 that is closed by a cap 105 after the gaseous pressure charge is applied within the chamber 103. When the liquid pressure chamber 102 is empty, at the time the gas pressure is applied into the chamber 103, the piston 100 will be in a left hand position. The sleeve 105 in the chamber 103 limits the movement of the piston 100 in a right hand direction.

The liquid pressure chamber 102 of the accumulator 12 connects with the pressure inlet port 83 by means of a passage 106 so that when liquid under pressure is supplied from the pump 90, the chamber 102 of the pressure accumulator will be filled with liquid to urge the piston into the position shown in the drawing against the pressure of the gas in the chamber 103 and thereby establish a predetermined volume of liquid in the chamber 102 that can be used by the servo motor 10 in the event the pressure source 90 should fail, the expansion of the gas in the chamber 103 provides for the desired pressure delivery of liquid from the chamber 102 to the servomotor for actuation thereof.

To prevent loss of fluid pressure from the chamber 102 if the pressure source or pump 90 should fail for any reason, a check valve 110 is provided in the inlet port 83 which closes the conduit 81 whenever the pressure in that conduit is below the pressure in the chamber 102.

If the pressure source or pump 90 should fail for any reason, it will then be necessary to actuate the master cylinder manually for a brake application. Should this occur, the sleeve 62 will be moved in a right hand direction against the left hand end of the sleeve 42 and thereby provide direct mechanical connection with the extension 31 for operation of the piston plunger 14 in the master cylinder 11. At this time however the plunger 35 will be moved forward manually with the result that a vacuum would be tended to be pulled in the work chamber 36 since there is no fluid under pressure available from the source 90. To prevent this action a cross flow passage 120 is provided between the outlet port 76 and the inlet port 83 with a check valve 121 being located in the port 120 that is normally urged in a left hand direction upon its seat so long as liquid pressure exists in the port 83 either from the source 90 or from the pressure chamber 102 of the accumulator 12.

However, when there is no liquid pressure in the inlet port 83 because of failure of the pump 90 and an exhaustion of fluid under pressure from the accumulator 12, the check valve 121 can open and allow fluid to flow from the exhaust chamber 37 of the servomotor through the passage 75 and thence from the outlet port 76 to the inlet port 83 and thence to the work chamber 36 through the ports and passages 69, 67, 68, 64, and 63. This cross flow of liquid prevents a vacuum being drawn in chamber 36 and thereby eliminates any possibility of retarding of movement of the master cylinder during a manual operation resulting from a loss of power from the power source.

In the normal operation of the device, fluid in the work chamber 36 will be connected with the outlet port 76 through the passages and chambers 63, 64, 71, 70, 65, 72, 37 and 75, the brakes being in a released position.

When the brakes are to be applied by movement of the master cylinder piston plunger 14 in a right hand direction, the actuating rod 49 moves the member 47 forwardly to close the exhaust port 70 and open the port 68 to allow liquid under pressure to be supplied to the work chamber 36 and thereby effect a power movement of the plunger 35 in a right hand direction for power actuation of the member 31 and the piston plunger 14 of the master cylinder 11. When the operator desires to stop the brake action, liquid under pressure will be supplied to the work chamber 36 until the port 68 is closed, at which time port 70 will also be closed and thereby retain the brake application in a hold position.

When the brakes are to be released movement of the actuator 47 in a left hand direction by the foot pedal 48 will open the exhaust port 70 and allow fluid under pressure to be exhausted from the work chamber 36 in a manner heretofore referred to.

While the form of embodiment of the invention as herein disclosed constitutes a preferred form, it is to be understood that other forms might be adopted as may come within the scope of the claims which follow.

What is claimed is as follows:

1. A hydraulically operated power unit adapted for actuating the brakes of a vehicle, comprising; a liquid pressure actuated servomotor including a cylinder having a plunger movable in the cylinder dividing the cylinder into two chambers one being a pressure work chamber and the other being an exhaust chamber, a valve device in said plunger spring urged in one direction normally to close a liquid pressure inlet passage communicating with said work chamber and open an exhaust passage connecting said work chamber with said exhaust chamber; means forming a pressure accumulator chamber adjacent said servomotor and including passage means connecting the accumulator chamber with said inlet passage, means forming an outlet passage from said exhaust chamber; and means forming a cross flow passage connecting said outlet passage with said inlet passage and including check valve means in said cross flow passage to prevent interconnection of the inlet and outlet passages so long as liquid pressure exists in the inlet passage.

2. A hydraulically operated power unit adapted for actuating the brakes of a vehicle, comprising; a liquid pressure actuated servo motor including a cylinder having a plunger movable in the cylinder dividing the cylinder into two chambers one being a pressure work chamber and the other being an exhaust chamber, a valve device in said plunger spring urged in one direction normally to close a liquid pressure inlet passage communicating with said work chamber and open an exhaust passage connecting said work chamber with said exhaust chamber; means forming a pressure accumulator chamber adjacent said servo motor and including passage means connecting the accumulator chamber with said inlet passage, means forming an outlet passage from said exhaust chamber, means forming a cross flow passage connecting said outlet passage with said inlet passage and including a check valve means in said cross flow passage to prevent interconnection of the inlet and outlet passages so long as liquid pressure exists in the inlet passage; and additional check valve means in said inlet passage to prevent loss of fluid pressure from said accumulator when fluid pressure fails between the last mentioned check valve and the source of fluid pressure.

3. A hydraulically operated power unit adapted for actuating the brakes of a vehicle, comprising; a liquid pressure actuated servo motor including a cylinder having a plunger movable in the cylinder dividing the cylinder into two chambers one being a pressure work chamber and the other being an exhaust chamber, a valve device in said plunger spring urged in one direction normally to close a liquid pressure inlet passage communicating with said work chamber and open an exhaust passage connecting said work chamber with said exhaust chamber; means forming a pressure accumulator chamber integral with said servo motor and adjacent the servo motor and including passage means connecting the accumulator chamber with said inlet passage; means forming an outlet passage from said exhaust chamber; and means forming a cross flow passage connecting said outlet passage with said inlet passage and including check valve means in said cross flow passage to prevent interconnection of the inlet and outlet passages so long as liquid pressure exists in the inlet passage.

4. A hydraulically operated power unit for actuating the brakes of a vehicle, comprising; a liquid pressure actuated servo motor including a cylinder having a plunger movable in the clinder dividing the cylinder into two chambers one being a pressure work chamber and the other being an exhaust chamber, a valve device in said plunger spring urged in one direction normally to close a liquid pressure inlet passage communicating with said work chamber and open an exhaust passage connecting said work chamber with said exhaust chamber; means forming a pressure accumulator cylinder adjacent to and parallel with said servo motor having piston means therein dividing said cylinder into a liquid pressure chamber and a gas pressure chamber and movable in the cylinder by action of the gaseous pressure in the gas pressure chamber to retain liquid in the liquid pressure chamber under pressure of the gas in the gas pressure chamber and including passage means connecting the liquid pressure chamber with said inlet passage; means forming an outlet passage from said exhaust chamber; and means forming a cross flow passage connecting said outlet passage with said inlet passage and including check valve means in said cross flow passage to prevent interconnection of the inlet and outlet passages so long as liquid pressure exists in the inlet passage.

5. A hydraulically operated power unit for actuating the brakes of a vehicle comprising, a housing having first and second cylinder means each closed at both ends thereof, a plunger slidable in said first cylinder means and dividing said cylinder means into two chambers one being a pressure work chamber and the other being an exhaust chamber, a valve device in said plunger spring urged in one direction normally to close a pressure inlet passage communicating with said work chamber and open an exhaust passage connecting said work chamber with said exhaust chamber, a plunger slidable in said second cylinder means and dividing the same into two chambers one being a liquid pressure chamber and the other being a gas pressure chamber, passage means in said housing connecting the said liquid pressure chamber of said second cylinder means with said inlet passage for supply of liquid under pressure to said work chamber of said first cylinder means, an outlet passage in said houisng from said exhaust chamber, and a cross flow passage connecting said outlet passage with said inlet passage and including check valve means in said cross flow passage to prevent interconnection of the inlet and outlet passages so long as liquid pressure exists in the inlet passage.

References Cited in the file of this patent

UNITED STATES PATENTS

| | | |
|---|---|---|
| 1,960,996 | Guernsey | May 29, 1934 |
| 2,170,890 | Allen | Aug. 29, 1939 |
| 2,343,698 | Parnell | Mar. 7, 1944 |
| 2,359,949 | Van Der Werff | Oct. 10, 1944 |
| 2,409,335 | Von Stackelberg | Oct. 15, 1946 |
| 2,661,597 | Edge | Dec. 8, 1953 |
| 2,775,957 | Anderson | Jan. 1, 1957 |